UNITED STATES PATENT OFFICE.

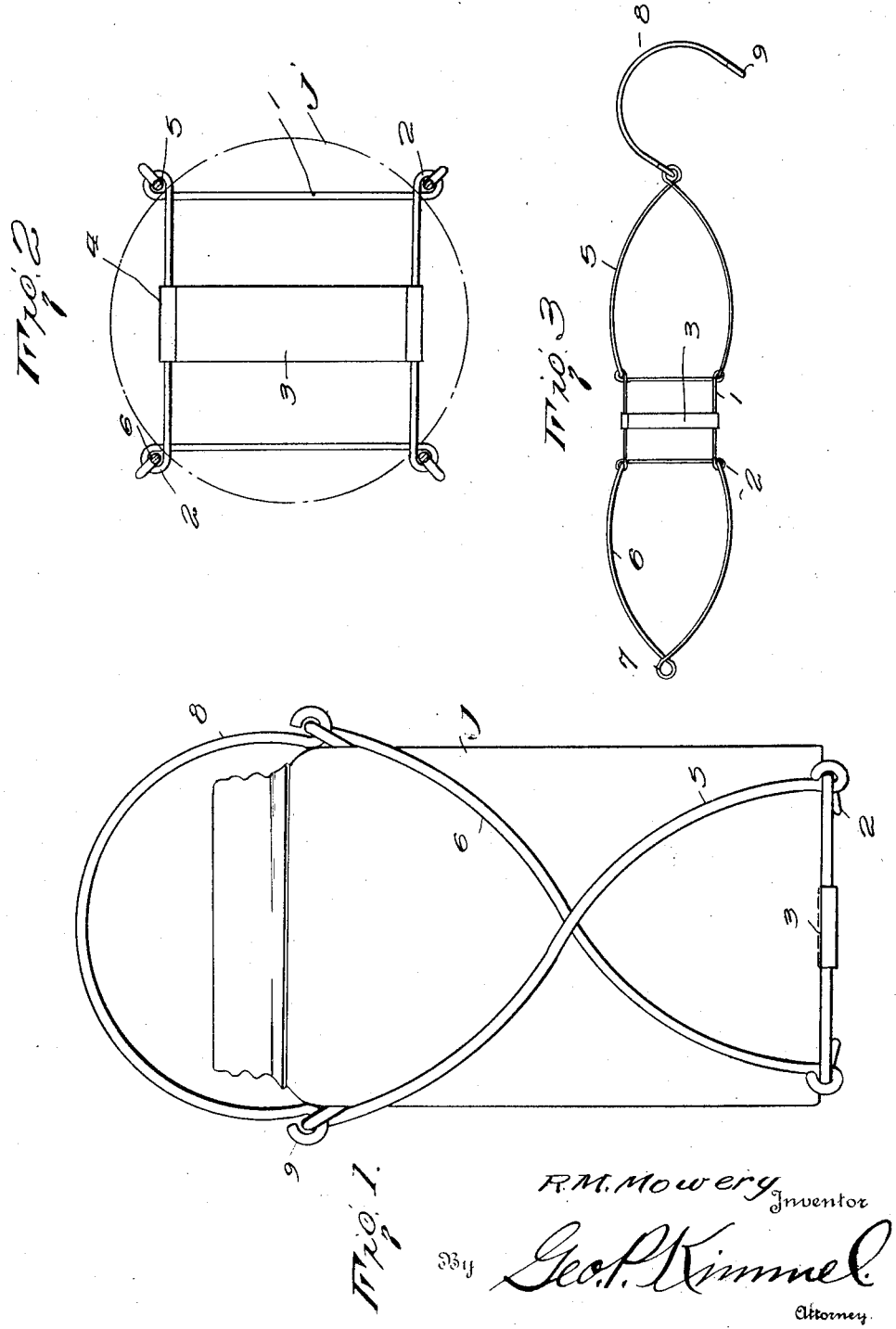

ROSIE M. MOWERY, OF NORTH YAKIMA, WASHINGTON.

JAR-RECEPTACLE.

1,329,989.  Specification of Letters Patent.  Patented Feb. 3, 1920.

Application filed May 6, 1918. Serial No. 232,745.

*To all whom it may concern:*

Be it known that I, ROSIE M. MOWERY, a citizen of the United States, residing at North Yakima, in the county of Yakima and State of Washington, have invented certain new and useful Improvements in Jar-Receptacles, of which the following is a specification.

This invention relates to improvements in receptacles and it is the principal object of the invention to provide a novel receptacle for use in the handling of preserving jars in order that the same can be placed in and removed from receptacles containing boiling water as used in the preserving of fruits and vegetables without danger of burning of the user's hands or the dropping and resultant breaking and wasting of the jar as well as its contents.

It is also an object of the invention to provide a receptacle of the character mentioned which can be easily and quickly engaged about a jar or other object to be handled thereby and when necessary, equally as readily removed therefrom, hence rendering the device interchangeable.

The improvements in the details and arrangement of parts will be apparent from an inspection of the accompanying drawings, in connection with the specific description hereinafter contained, and wherein the preferred embodiments of the invention are disclosed for the purpose of imparting a full understanding of the same.

In the drawings:

Figure 1 is a side elevation of the improved jar receptacle,

Fig. 2 is a horizontal section therethrough,

Fig. 3 is a plan view of the same in blank form.

Having more particular reference to the drawings, in connection with which like reference characters will designate corresponding parts throughout the several views, my improved jar receptacle or holder includes a substantially square base 1, looped at the various corners thereof as at 2 and having a bracing strip 3 formed of sheet metal extended thereacross and secured to the opposite sides of the same by rolling it upon itself as at 4, thus preventing undue expanding of the sides of the bottom 1 and also providing an efficient support for an object arranged in the receptacle.

Pivotally engaged with the looped corners 2 of the base 1 are side members 5 and 6, said members being formed of single lengths of wire bent intermediate the ends thereof to constitute substantially U-shaped elements, said intermediate portions being looped as at 7 for a purpose which will be presently described. In this connection, it is to be noted that the side members 5 and 6 are curved or off-set as clearly shown in the Fig. 1 in order that the same, when crossed, will serve to provide an effectual form of holder for a jar such as designated by the reference letter *j* or other object positioned between the same.

Engaged with one of the looped ends 7 of the side members is a bail 8 having the remaining end thereof hooked as at 9 and adapted for engagement with the opposite looped portion 7. In this way, a handle will be provided for the receptacle or holder whereby the same together with a jar or other object supported therein can be readily engaged and lifted.

In using my improved form of jar receptacle, the pivoted side members 5 and 6 are crossed as shown in the Fig. 1 whereupon the jar *j* is placed therebetween, the bottom of the same resting on the base 1 and the bracing strip 3. At this time, the hooked end of the bail 8 is engaged with the remaining looped end 7. The holder may be now engaged in a user's hand and removed together with the jar from the water or receptacle.

With my improved forms of jar receptacles or holders, it will be understood, by persons skilled in the art, that I have provided an article of manufacture which can be marketed at a low cost and which, by reason of its construction and scope of use will afford an exceedingly desirable and convenient article for housewives, providing a means whereby jars and other objects can be placed therein and lifted or carried to various places without liability of dropping therefrom. Furthermore, when not in use, the holders, by reason of their collapsible structure can be folded into compact form and placed in a limited or convenient place.

Manifestly, the construction shown is capable of considerable modification and such modification as is within the scope of my claim, I consider within the spirit of my invention.

I claim:

A device of the character described, comprising a substantially square shaped open base frame formed from a wire having eyes twisted therefrom at the corners of said frame, a reinforcing strip extending across the frame and secured to opposite sides thereof, loop like members extending in cross relation and composed of lengths of wire bent upon themselves to provide arms curved longitudinally and having eyes at the extremities of said arms loosely engaged with the eyes on the frame, and a bail pivotally engaged with the members in their crossed relation to each other and constituting a handle.

In testimony whereof, I affix my signature hereto.

ROSIE M. MOWERY.